(12) United States Patent
Bruntz et al.

(10) Patent No.: US 6,402,962 B1
(45) Date of Patent: Jun. 11, 2002

(54) SELF-CLEANING FILTER WITH BYPASS

(75) Inventors: Jordan S. Bruntz, Baxter; Curtis J. Tremel; Eric J. Miller, both of Newton, all of IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/625,446

(22) Filed: Jul. 26, 2000

(51) Int. Cl.⁷ .............................. B01D 29/00
(52) U.S. Cl. .............. 210/739; 210/791; 210/805; 210/108; 210/194; 210/411
(58) Field of Search ................ 210/791, 805, 210/108, 194, 411, 739

(56) References Cited

U.S. PATENT DOCUMENTS

| | | | |
|---|---|---|---|
| 3,353,682 A | 11/1967 | Silva | |
| 3,622,003 A | 11/1971 | Czech | 210/108 |
| 3,684,096 A | 8/1972 | Krectchman | 210/356 |
| 3,727,435 A | 4/1973 | Menk | 68/18 F |
| 4,217,667 A | * 8/1980 | Whitehouse | |
| 5,493,745 A | 2/1996 | Hauch | 8/158 |

* cited by examiner

*Primary Examiner*—Betsey Morrison Hoey
(74) *Attorney, Agent, or Firm*—Zarley, McKee, Thomte, Voorhees & Sease

(57) ABSTRACT

A self-cleaning filter with a bypass port is provided for a washing machine that recirculates water back to the wash tub. The filter includes a housing with a filter element disposed therein. The filter element normally filters lint and other material from the water drained from the wash tub, with the water then being recirculated back to the wash tub. When the filter element becomes clogged, the water automatically flows through a bypass port in the filter, such that recirculation continues. The filter element is automatically cleaned by back-washing the filter.

12 Claims, 4 Drawing Sheets

SELF-CLEANING FILTER WITH BYPASS

BACKGROUND OF THE INVENTION

Laundry washing machines that recirculate water are known in the art. Typically, such water recirculation machines include a filter to remove solids, such as lint, from the water as it is recirculated to the washing machine wash tub during a clothes washing cycle. However, such filters are not self-cleaning and must be manually removed and cleaned when the filter becomes plugged with lint and other materials. Such cleaning results in down time for the machine. Also, once the filter becomes plugged, water will not easily flow therethrough, such that the recirculation function of the machine is inoperative or compromised.

Accordingly, a primary objective of the present invention is the provision of a self-cleaning filter with a bypass port for a water recirculation washing machine.

Another objective of the present invention is the provision of an improved washing machine and a method of recirculating water therein wherein recirculation of water can continue after the filter is clogged.

Another objective of the present invention is the provision of a filter for a water recirculation washing machine which is automatically cleaned without removing the filter.

A further objective of the present invention is the provision of a filter for a water recirculation washing machine wherein the water automatically flows through a bypass port after the filter becomes clogged.

Another objective of the present invention is the provision of a self-cleaning filter with a bypass port which is economical to manufacture and durable and efficient in use.

These and other objectives will become apparent from the following description of the invention.

SUMMARY OF THE INVENTION

The self-cleaning filter with the bypass port of the present invention is intended for use in a washing machine which recirculates water from the wash tub drain outlet back into the wash tub. The filter includes a housing with a filter element disposed therein. Water from the wash tub normally passes through the filter so as to remove solids, such as lint, therefrom. The filter element includes one or more bypass ports through which the water automatically flows when the filter element becomes clogged with lint or other matter, so that the water can continue to recirculate. Check valves are opened and closed when the direction of pumping is reversed so as to reverse the flow of water through the filter element, thereby automatically cleaning the filter without removing the filter from the plumbing of the washing machine.

DETAILED DESCRIPTION OF THE DRAWINGS

Figure 1:
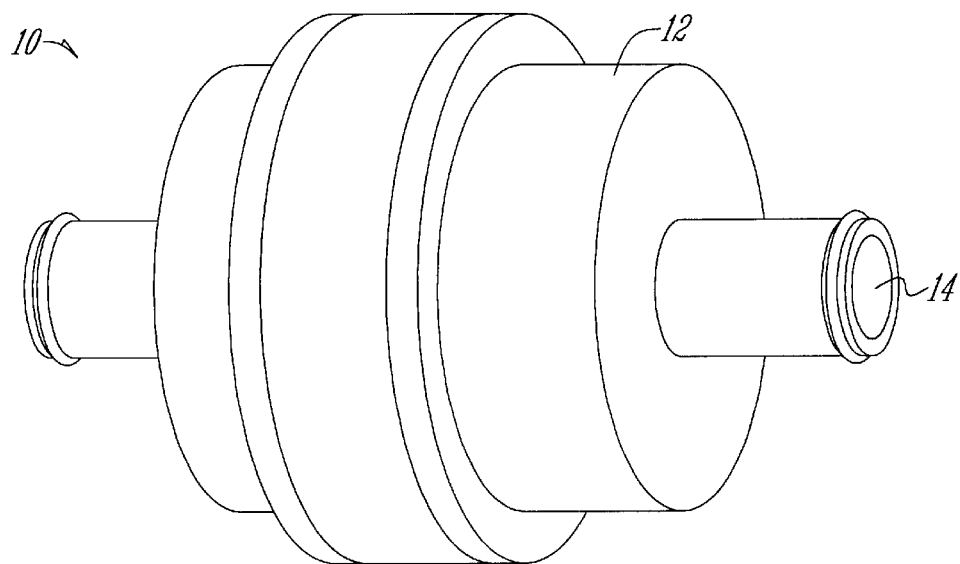
FIG. 1 is a perspective view of a first embodiment of the filter of the present invention.
Figure 2:
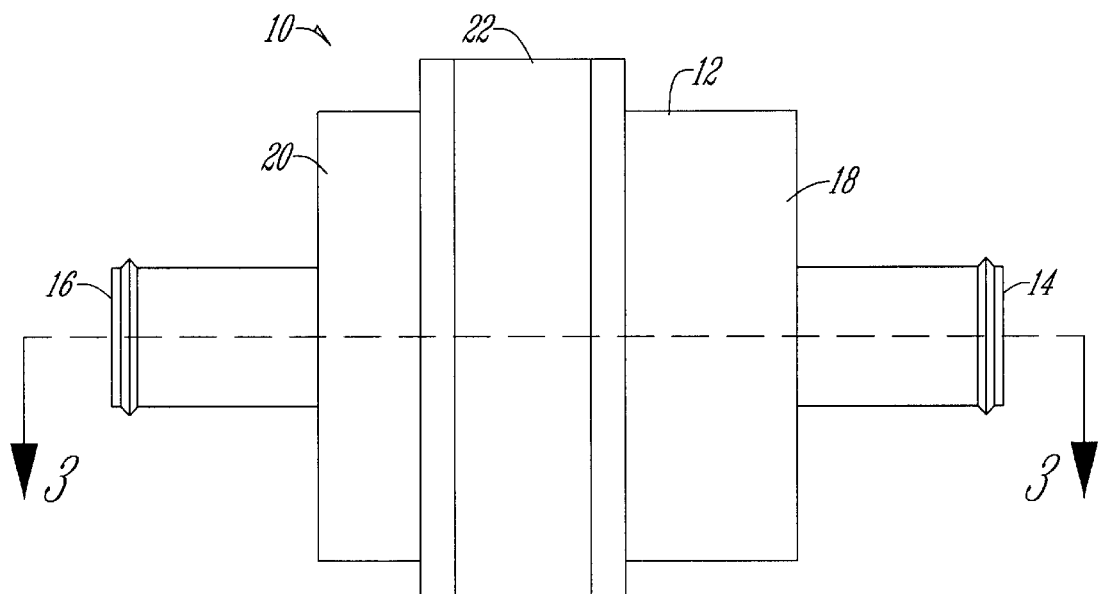
FIG. 2 is a side elevation view of the filter.

The present invention is directed towards a filter 10 adapted for use in a laundry washing machine which recirculates water from the drain outlet 37 of the wash tub 32 and back into the wash tub 32. The filter 10 includes a housing 12 with a water inlet 14 and a water outlet 16. Preferably, the housing 12 is made of plastic, and the inlet 14 and outlet 16 are integrally formed with opposite ends 18, 20, respectively, of the housing 12. A central ring or collar 22 extends between the opposite ends 18, 20 of the housing 12 but end 18 could be molded to include collar 22. The housing components 18, 20 and 22 are held together in any convenient manner, including a snap or press fit, clamps, bolts, or the like.

Figure 3:
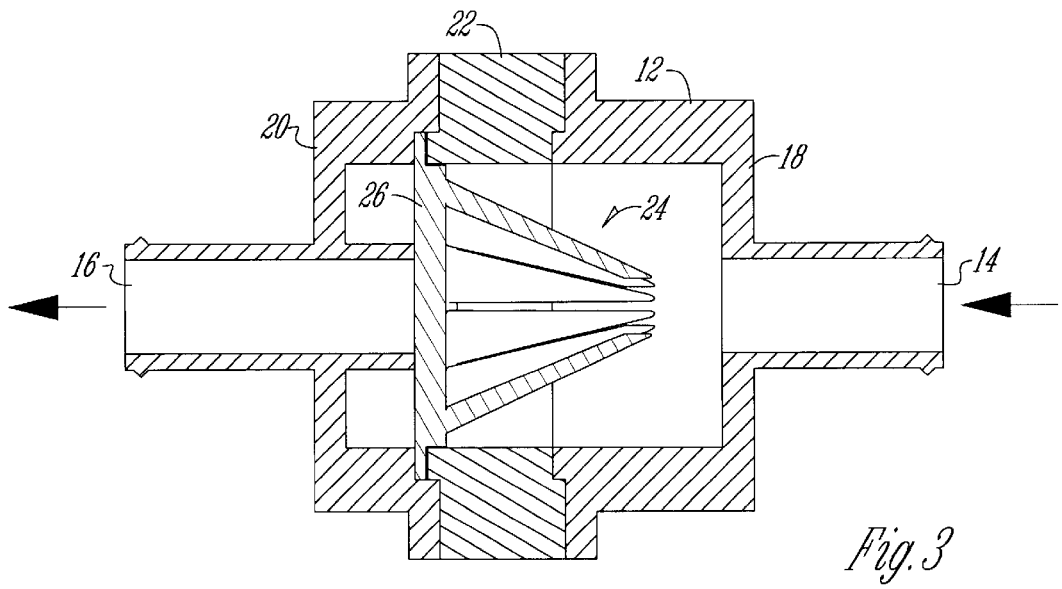
FIG. 3 is a sectional view taken along lines 3—3 of FIG. 2.
Figure 4:
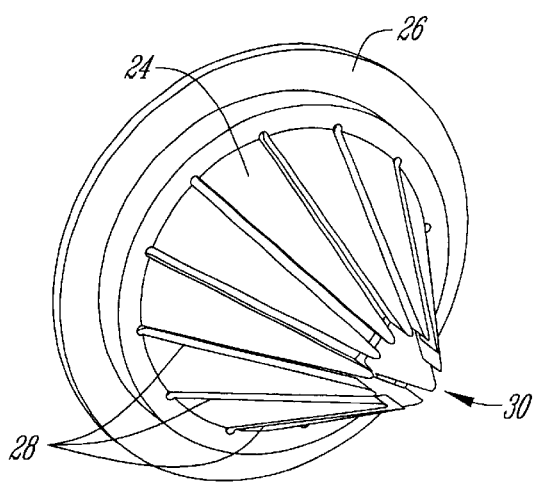
FIG. 4 is a perspective view of the filter element of the preferred embodiment.
Figure 5:
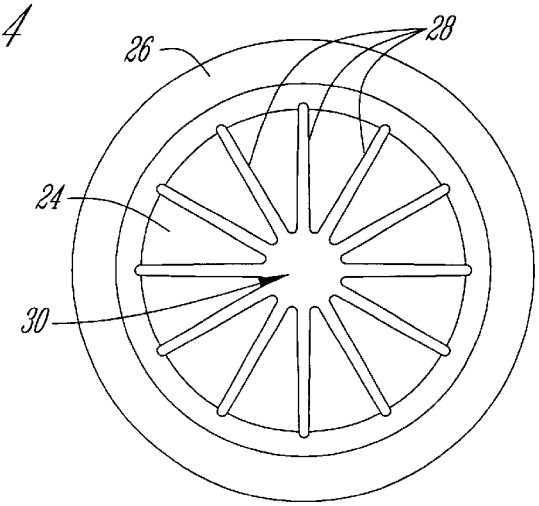
FIG. 5 is an end view of the filter element of the preferred embodiment.

A filter element 24 is contained within the housing 12, as best seen in FIG. 3. The filter element 24 has a conical shape, with a base 26 sandwiched between the outlet end 20 and the central collar 22 of the housing 12. The filter element 24 also has a plurality of slots 28 formed therein through which the water or liquid flows, such that the lint or other solid materials are retained on the conical portion of the filter element 24. A bypass port 30 is provided in the filter element 24. The size of the bypass port 30C is relatively large, compared to the slots 28, such that the bypass port normally does not retain lint or other matter in the water. When the slots 28 of the filter element 24 become clogged with lint or other matter, the water continues to flow through the bypass port 30 for recirculation to the washing machine tub.

Figure 6:
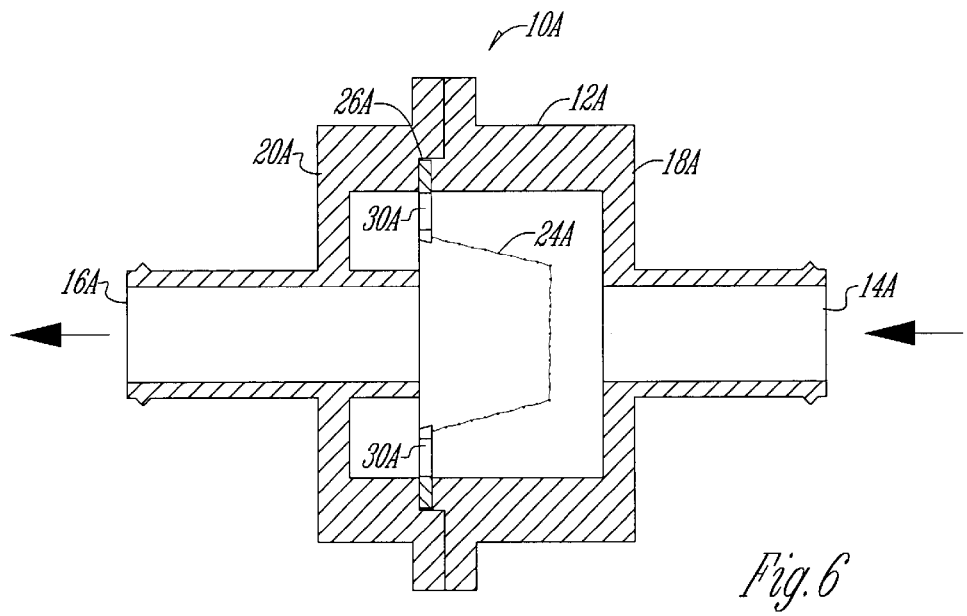
FIG. 6 is a sectional view similar to FIG. 3, showing an alternative embodiment of the filter of the present invention.
Figure 7:
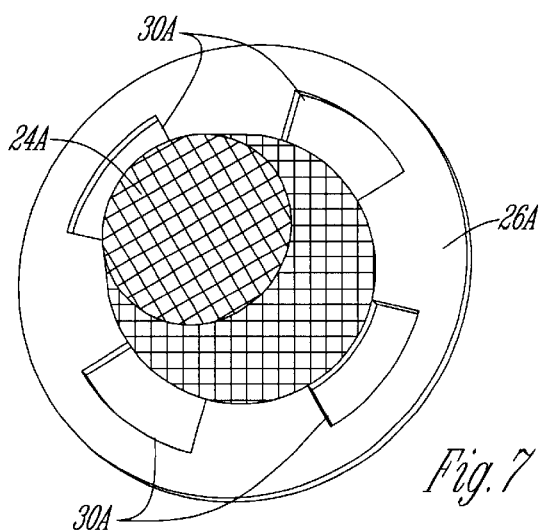
FIG. 7 is a perspective view of the filter element of the alternative embodiment.
Figure 8:
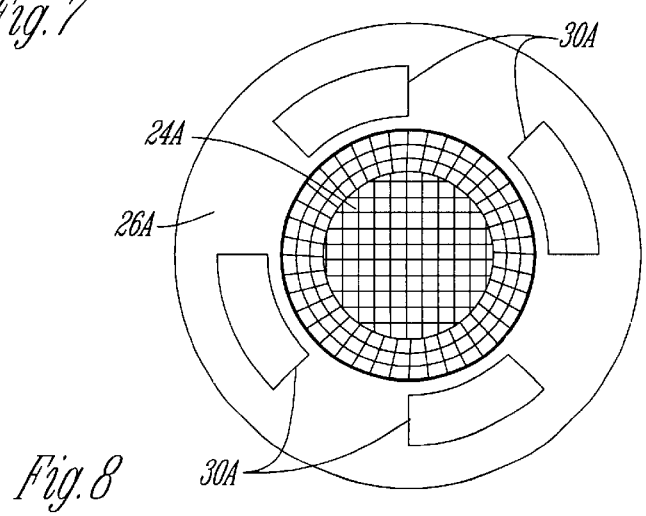
FIG. 8 is an end view of the alternative embodiment filter element.

A second embodiment of a filter 10A is shown in FIGS. 6–8. In the alternative embodiment, the housing 12A includes a water inlet 14A in the inlet end 18A and a water outlet 16A in the outlet end 20A. The housing 12A does not include a collar 22, as in the preferred embodiment.

The filter element 24A of the second embodiment includes a base 26A which is sandwiched between the inlet and outlet ends 18A, 20A of the housing 12A. The filter element 24A is generally comprised of a mesh screen which catches lint and other matter as the water flows through the filter element 24A. The filter element 24A includes bypass ports 30A through which the water flows when the screen becomes clogged.

Figure 9:
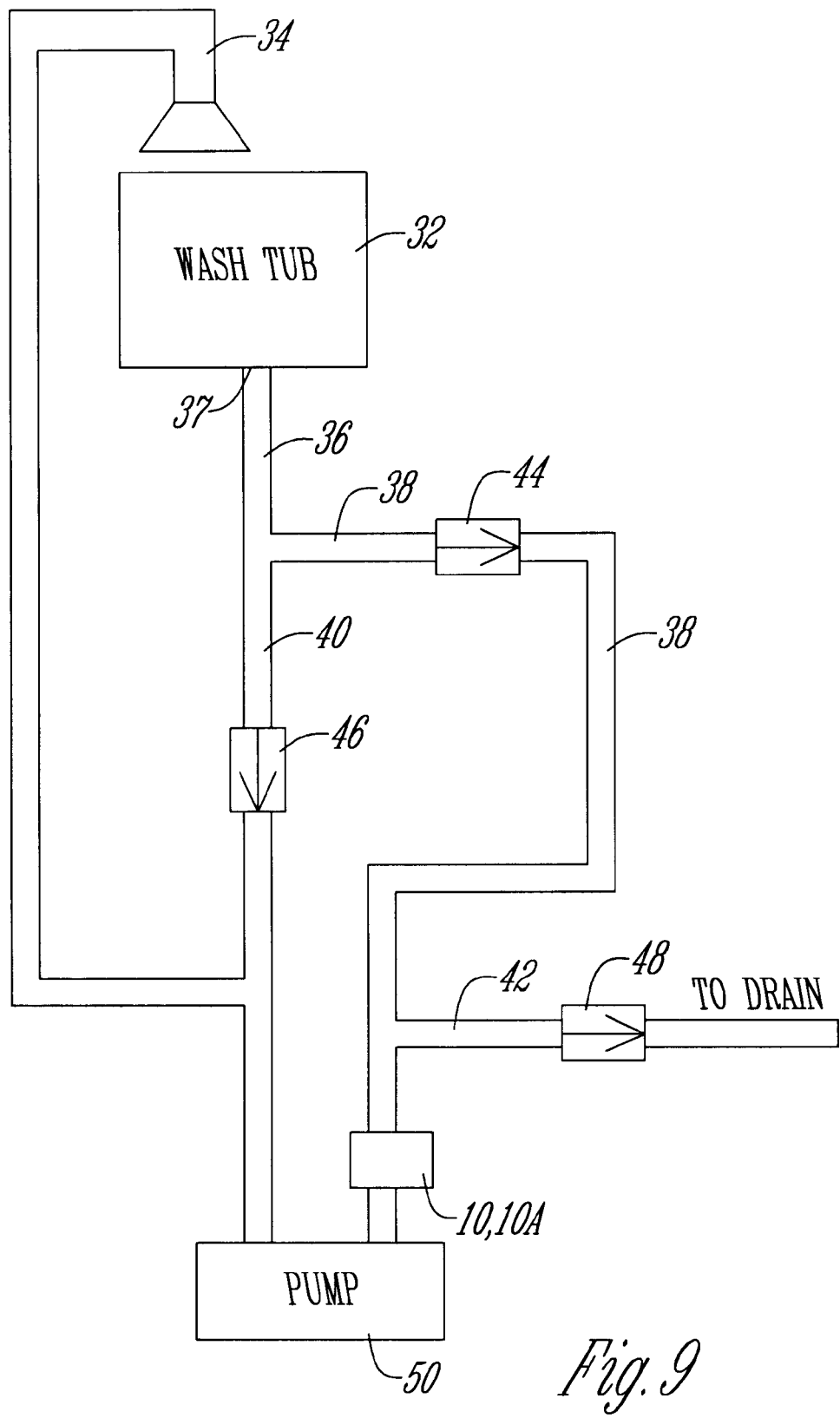
FIG. 9 is a schematic view showing the filter element installed in the plumbing of a water recirculation washing machine, according to the present invention.

A washing machine water recirculation system using the filter 10, 10A of the present invention is schematically shown in FIG. 9. The washing machine includes a wash tub 32 for holding laundry to be washed. The plumbing for the washing machine includes a water line 34 supplying recirculation water to the wash tub 32, and a water drain line 36 for draining or removing water from the wash tub 32. The water drain line 36 branches into a recirculation line 38 in which the filter 10, 10A is installed. The water drain line 36 includes a second branch 40 for back washing the filter 10, 10A, as described below. The water recirculation branch 38 also includes a water discharge line 42 which drains the water from the wash tub 32 when pump 50 is reversed.

A series of check valves 44, 46, and 48 are provided in the plumbing of the washing machine so as to control the flow of water to and from the wash tub 32. A reversible pump 50 is provided for pumping the water in a desired path.

In operation, the washing machine wash tub 32 is filled with water and the wash cycle is operated to wash laundry in the wash tub 32. In the normal wash operation with pump 50 operating in the recirculation direction, the check valve 44 allows water to flow through filter 10, 10A and the check valve 46 prevents water from traveling up drain line 36 so that the water is directed to water line 34 for recirculation into wash tub 32. Thus, the water flows through the filter 10, 10A for removal of solids therefrom, and then recirculated to the wash tub 32. When the filter element 24, 24A becomes plugged, the water will automatically flow through the bypass port 30, 30A for continued recirculation to the wash tub 32. After the wash cycle is completed, the water is drained from the wash tub 32 by reversing pump 50.

Periodically, the filter element 24, 24A must be cleaned. Cleaning is automatically achieved when the pump 50 is reversed so that the water flows in a reverse direction through check valve 46, the filter 10, 10A, and check valve 48 thereby forcibly removing lint and other material from the filter element 24, 24A, and then discharging the water from the washing machine to drain. Thus, the filter 10, 10A is self-cleaning, without the need to remove the filter from the plumbing of the washing machine.

It is understood that the dimensions and configuration of the filter 10, 10A may take various forms, other than those shown in the drawings.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved laundry washing machine having a wash tub and plumbing allowing recirculation of water from a wash tub drain and back to the wash tub, the improvement comprising:
   a filter disposed in the plumbing so as to filter water leaving the wash tub before the water is recirculated back to the wash tub;
   the filter having a bypass port to allow water to flow therethrough after the filter becomes clogged.

2. The improved laundry washing machine of claim 1 wherein the filter includes a filter housing with a filter element therein.

3. The improved laundry washing machine of claim 2 wherein the filter element includes a plurality of slots through which water normally flows for filtering.

4. The improved laundry washing machine of claim 2 wherein the filter element includes a mesh screen through which water normally flows for filtering.

5. The improved laundry washing machine of claim 1 wherein the filter includes opposite ports through which water normally flows in a first direction for filtering by the filter element, and through which water flows in an opposite second direction to clean the filter element.

6. A filter for removing solids from a liquid, comprising:
   a housing having a liquid inlet and a liquid outlet;
   a filter element within the housing wherein the filter element is conically shaped, with a narrow end toward the liquid inlet and a wide end toward the liquid outlet, such that liquid normally flows through the filter element to remove solids from the liquid; and
   a bypass port in the filter element through which liquid flows when the filter element becomes clogged.

7. The filter of claim 6 wherein the filter element includes a mesh screen through which liquid normally flows for filtering.

8. The filter of claim 6 wherein the filter element is constructed of plastic.

9. The filter of claim 6 wherein the filter element includes a plurality of slots through which liquid normally flows for filtering.

10. A method of recirculating water in a washing machine having a wash tub for holding water to wash clothes, the method comprising:
    draining water from the wash tub;
    passing the water through a filter to remove solids;
    recirculating the filtered water back to the wash tub; and
    passing the water from the wash tub through a bypass port in the filter, after the filter becomes clogged, for recirculation back to the wash tub.

11. The method of claim 10 further comprising backwashing water in a reverse direction through the filter to remove the solids from the filter.

12. The method of claim 10 wherein passing water through the bypass port is automatic after the filter becomes clogged.

* * * * *